ERROR CORRECTION DEVICE UTILIZING SPARE SUBSTITUTION

Filed March 30, 1960 10 Sheets-Sheet 1

INVENTORS
JAMES H. GRIESMER
JOHN PAUL ROTH
ERIC G. WAGNER
Thomas & Crickenberger
ATTORNEYS

ERROR CORRECTION DEVICE UTILIZING SPARE SUBSTITUTION

Filed March 30, 1960 10 Sheets-Sheet 4

ERROR CORRECTION DEVICE UTILIZING SPARE SUBSTITUTION

Feb. 16, 1965 J. H. GRIESMER ETAL 3,170,071

ERROR CORRECTION DEVICE UTILIZING SPARE SUBSTITUTION

Filed March 30, 1960 10 Sheets-Sheet 8

Feb. 16, 1965 J. H. GRIESMER ETAL 3,170,071

ERROR CORRECTION DEVICE UTILIZING SPARE SUBSTITUTION

Filed March 30, 1960 10 Sheets-Sheet 9

3,170,071

ERROR CORRECTION DEVICE UTILIZING SPARE SUBSTITUTION

James H. Griesmer and John Paul Roth, Ossining, and Eric G. Wagner, New York, N.Y., assignors to International Business Machines Corporation, New York, N.Y., a corporation of New York Filed Mar. 30, 1960, Ser. No. 18,601
10 Claims. (Cl. 307—88.5)

This invention relates to data handling devices and more particularly to such devices employing error correction equipment.

In data processing devices many component parts such as AND circuits, OR circuits, flip-flops, etc., are employed in the construction. It is the practice in some instances to construct such machines from a number of plates on which logic or storage circuits are printed. Each plate may have a number of output leads which run to the edge of the plate, and from there connecting wires may run to the input leads of other plates. In data processing machines constructed of cryogenic devices the problem of broken lines and components arises. A broken line or component is very difficult to repair when buried in a liquefied gas bath. Such breakage may occur during manufacture or installation or during operation from various causes. Several devices for correcting the breakage of interplate wires are illustrated and described in copending application Serial No. 862,940 for Error-Detecting and Correcting System by Michael O. Rabin et al. and Serial No. 863,042 for Error-Detection and Correction Device by Luther H. Haibt which are assigned to the assignee of the present invention. It is the breakage of leads and components disposed on plates which creates the problem to which this invention is directed.

It is customary in many instances to construct cryogenic devices with thin films disposed on a plate, and such thin film devices may serve as OR circuits, AND circuits, logical devices and the like which are interconnected to form a data processing system. If it is assumed for illustrative purposes that cryotrons are employed, then the elemental components of construction are wires, coils and cryotron gate elements. In order to insure accurate processing of data by machines constructed of cryotrons and other cryogenic components, there is provided according to this invention one or more spare components for each original component in the machine. The spare components may be referred to as special purpose spares since they are identical in construction to the original components with which they are associated. In case an original component develops a defect, one of the special purpose spares may be substituted for it, and reliable operation may continue.

According to another feature of this invention a highly reliable switching arrangement is provided which permits a special purpose spare to be selectively substituted for the associated original component. For this purpose a rectangular array using inhibitors is preferably employed. The array may be defined in terms of horizontal and vertical lines with inhibitors disposed at selected points where the horizontal and vertical lines cross one another. Currents in one set of the coordinate lines may be selectively diverted by currents in the other set of coordinate lines which operate the inhibitors. Currents so diverted may be directed to flip-flop devices which in turn substitute a special purpose spare for a defective component.

It is a feature of this invention to provide spare coordinate lines for the switching array to insure its proper operation should defects occur therein. For this purpose multiple parallel paths are provided in at least one set of coordinates of the array, say the horizontal lines, so that a diverted current may have at least one good path available. This increases the probability of operating the rectangular switching array and thereby enhances the reliability of the switching device. The increase in reliability here provides added assurance that a special purpose spare may be substituted for a defective component, and the overall reliability of the data processing device is improved. Therefore, a machine constructed according to the principles of this invention may have a more complex system than earlier machines having the same factor of reliability.

It is another feature of this invention to enhance the overall reliability of a data processing device by having special purpose spares available, but not in use. These special purpose spares are redundant components, but they are not employed until it is determined that the original component is defective. Thus, the redundant components themselves may be defective, but this does not affect the data processing device unless the original component becomes defective. This contrasts with the case where redundant code channels are employed. In a code checking arrangement, for example, where four information channels and three redundant code channels are employed, the redundant code channels are operated as part of the data processing system. Thus even though no defects were present in the information channels, defects in the redundant code channels could produce an incorrect result when data transmitted over the channels is processed.

In one arrangement according to this invention, rectangular array inhibitor devices are employed for logical and storage purposes throughout the data processing system. For an explanation of such devices reference is made to copending application Serial No. 18,692 for Inhibitor Logic Arrays by Raymond E. Miller et al. Such arrays may be employed as flip-flops, AND circuits, OR circuits, adder circuits and the like. If a circuit element normally has three component parts and two spares are provided for each component part, then the total number of component parts is expanded to nine. If an original and two spare components are to be interchangeably substituted one for another under control of a switching device in the form of an array having three control paths, a three-by-three array is formed. In essence the three-by-three array includes three control paths arranged according to one coordinate and three components, an original and two spares, arranged according to another coordinate of the array. Inhibitors are disposed at selected points where the lines cross one another so that various combinations of signals applied to the control paths of one coordinate of the array select one and only one of the components at any given time. With an arrangement of this sort any two paths of the three-by-three array may develop open circuits without disabling the array entirely. If a four-by-four array is employed, then the number of open circuits which may occur randomly without disabling the array entirely is increased to three. With a five-by-five array the number of such errors is increased to four and so forth.

These and other features of this invention may be more fully appreciated when considered in the light of the following specification and the drawings in which:

FIGS. 9 through 11 illustrate in detail a portion of the switching arrangement shown in block form in FIG. 8; and FIG. 12 shows how FIGS. 9 through 11 should be arranged with respect to one another.

Figure 1:
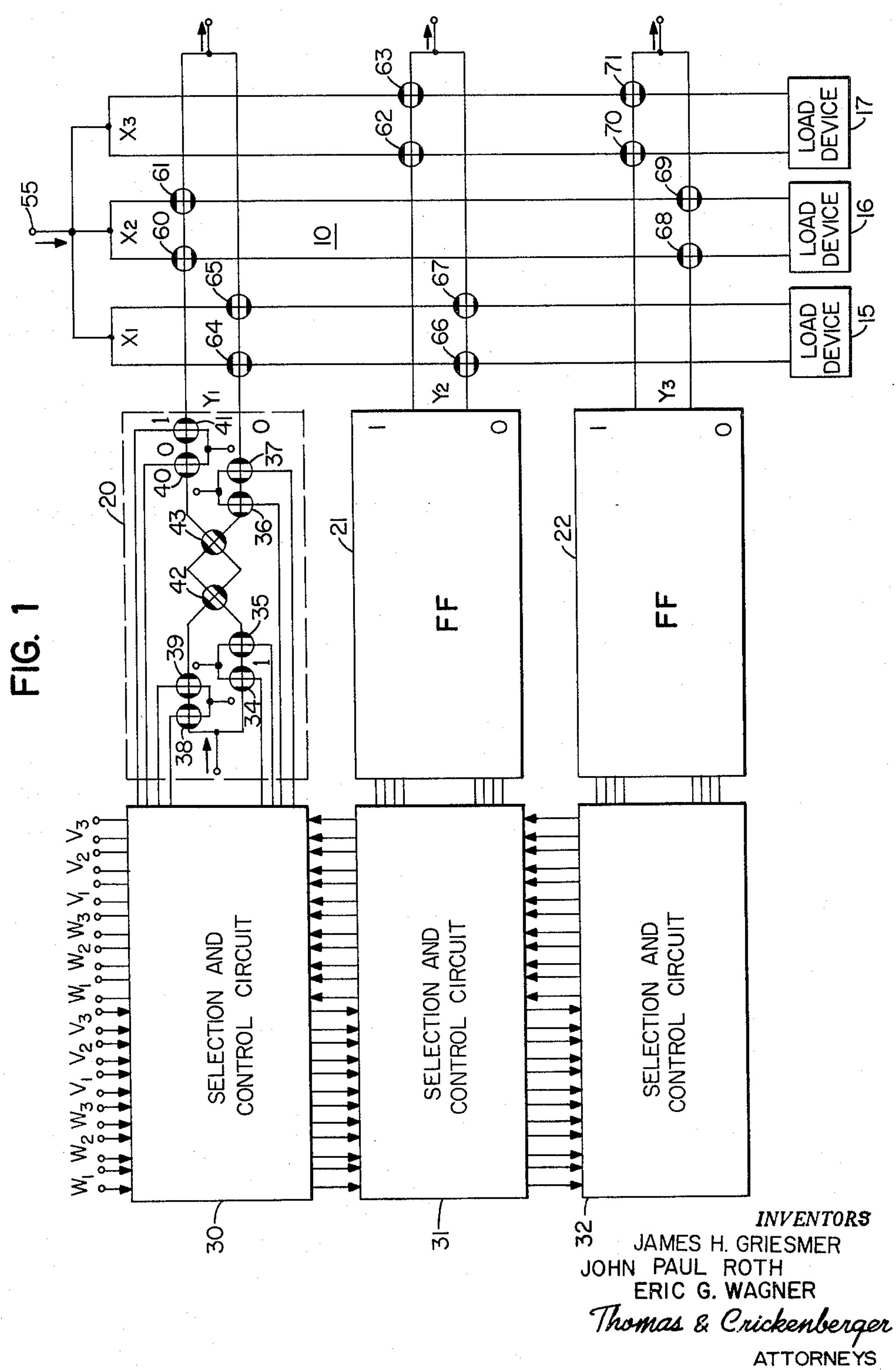
FIG. 1 illustrates one arrangement according to this invention.

Referring to FIG. 1 of the drawings, a three-by-three array 10 is illustrated with three horizontal control channels or paths $Y_1$, $Y_2$ and $Y_3$ and with three vertical components defined in part by the paths $X_1$, $X_2$ and $X_3$. The vertical paths $X_1$, $X_2$ and $X_3$ and their associated load devices 15, 16 and 17 constitute three components which are identical in construction. The path $X_1$ and the load device 15 may be considered an original component; the path $X_2$ and the load device 16 may be considered one special purpose spare; and the path $X_3$ and the load device 17 may be considered a second special purpose spare. The objective is to select one of the vertical paths and its associated load device and to hold the remaining two vertical paths and their associated load devices in a standby or inoperative condition.

Flip-flops 20, 21 and 22 are associated with and control respective horizontal control lines $Y_1$, $Y_2$ and $Y_3$. Each of the flip-flops 20 through 22 is selected and controlled by respective selection and control circuits 30, 31 and 32. Each of the flip-flops 20 through 22 is identical in construction, and only the flip-flop 20 is illustrated in detail. It includes one pair of inhibitors 34 and 35 and another pair of inhibitors 36 and 37 which are energized to set the flip-flop to the One state. One pair of inhibitors 38 and 39 and another pair of inhibitors 40 and 41 are energized to set the flip-flop in the Zero state. A pair of inhibitors 42 and 43 are cross-coupled as illustrated, and they serve to hold the flip-flop in the existing state.

Figure 2:
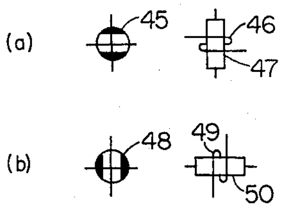
FIG. 2 illustrates a cryotron and the legend employed to depict it.

The inhibitor may be any suitable type of device which responds to current on one line and establishes a resistive condition in the other line. The inhibitor may be a cryotron or any other suitable device. In case they are cryotrons, the legend employed throughout the drawings is illustrated in FIG. 2 along with the indicated arrangement of the cryotron. If current flows along the horizontal line of the inhibitor 45 in FIG. 2, it establishes a resistive condition in the vertical line. Accordingly, the cryotron in FIG. 2*a* has its control winding 46 energized by a current on the horizontal line, and the magnetic field established by this winding creates a resistive condition in the gate 47 disposed in the vertical line. In FIG. 2*b* an inhibitor 48 creates a resistive condition in the horizontal line thereof whenever current flows in the vertical line. A cryotron used for this purpose is arranged as depicted in FIG. 2*b*. A control winding 49 receives current in the vertical line and creates a resistive condition in a gate 50 disposed in the horizontal line. The gate 50 is made of a soft superconductive material while the coil 49 is made of hard superconductive material.

In operation, the rectangular array 10 in FIG. 1 directs current from a terminal 55 through one of the vertical paths $X_1$, $X_2$ or $X_3$ to its associated component part 15, 16 or 17. The flip-flops 20 through 22 are operated to perform this function. The manner in which the flip-flops must be operated in order to select a given vertical path and associated load device is illustrated in Table I below.

*Table I*

| Selected Component | $Y_1$ | $Y_2$ | $Y_3$ |
|---|---|---|---|
| $X_1$ | 1 | 1 | ---------- |
| $X_2$ | 0 | ---------- | 1 |
| $X_3$ | ---------- | 0 | 0 |

In order to select vertical path $X_1$ and load device 15, the flip-flop 20 establishes a signal in the One output line on horizontal path $Y_1$; the flip-flop 21 establishes a current in the One line of horizontal path $Y_2$; and the flip-flop 22 may establish a current in either the One or the Zero line of the horizontal path $Y_3$. Should a defect occur in the vertical path $X_1$ or its associated load device 15, the flip-flops 20, 21 and 22 may be operated to select the vertical path $X_2$ and its associated load device 16. In this case the flip-flop 20 is set to the One state to provide a current on the One line of the horizontal path $Y_1$; the flip-flop 21 is set to the Zero or the One state to provide a current on either the One or Zero line of the horizontal path $Y_2$; and the flip-flop 22 is set to the One state to provide a current on the One line of the horizontal path $Y_3$. Should the vertical path $X_2$ or its associated load device 16 become defective, the vertical path $X_3$ and its associated load device 17 may be placed in operation by setting the flip-flops 21 and 22 to the Zero state.

Whenever a given vertical path $X_1$, $X_2$ or $X_3$ is selected, the remaining two of these paths is made resistive so that current from the terminal 55 is directed to the selected path. If the vertical path $X_1$ and its associated load device 15 are to be selected, for example, current flows along the One line of the horizontal path $Y_1$, and the inhibitors 60 and 61 render the vertical path $X_2$ resistive. Current from the flip-flop 21 flows along the One line of horizontal path $Y_2$ and energizes inhibitors 62 and 63 to make the vertical path $X_3$ resistive. Accordingly, the current from the terminal 55 is diverted by the resistive paths $X_2$ and $X_3$ along the superconductive path $X_1$ to the load device 15. It is pointed out that the inhibitors 64 and 65 of the horizontal path $Y_1$ and the inhibitors 66 and 67 of the horizontal path $Y_2$ are not operated. By proceeding in like fashion, it readily can be seen that when the vertical path $X_2$ is selected, inhibitors 60, 61, 68 and 69 are not energized and that the inhibitors 64, 65 of the vertical path $X_1$ and the inhibitors 70 and 71 of the vertical path $X_3$ are energized. When the vertical path $X_3$ is selected, this path is rendered superconductive because the inhibitors 62, 63, 70 and 71 are not energized. The inhibitors 66 and 67 in the vertical path $X_1$ and the inhibitors 68 and 69 in the vertical path $X_2$ are energized to make their respective paths resistive. In essence then two of the vertical paths are deselected by rendering them resistive, and one of the vertical paths is selected by rendering it superconductive. Current then flows from the terminal 55 through the superconductive path to its associated component load device.

Figure 7:
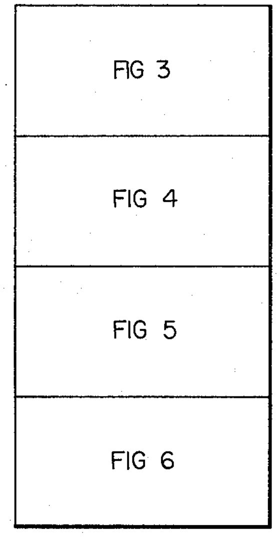
FIG. 7 shows how FIGS. 3 through 6 should be arranged with respect to one another.
Figure 3:
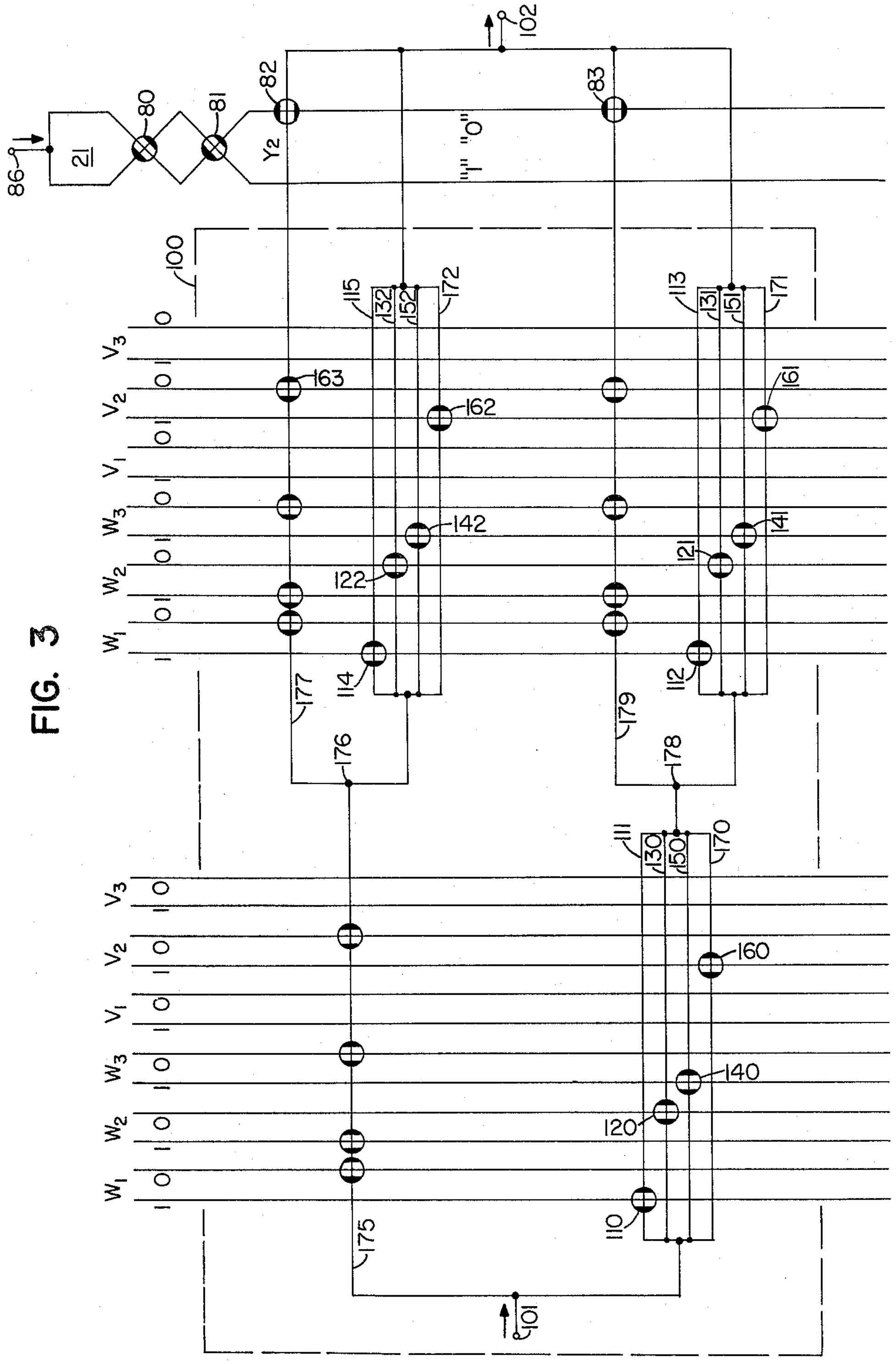
FIGS. 3 through 6 illustrate in detail a portion of the switching arrangement shown in block form in FIG. 1.
Figure 4:
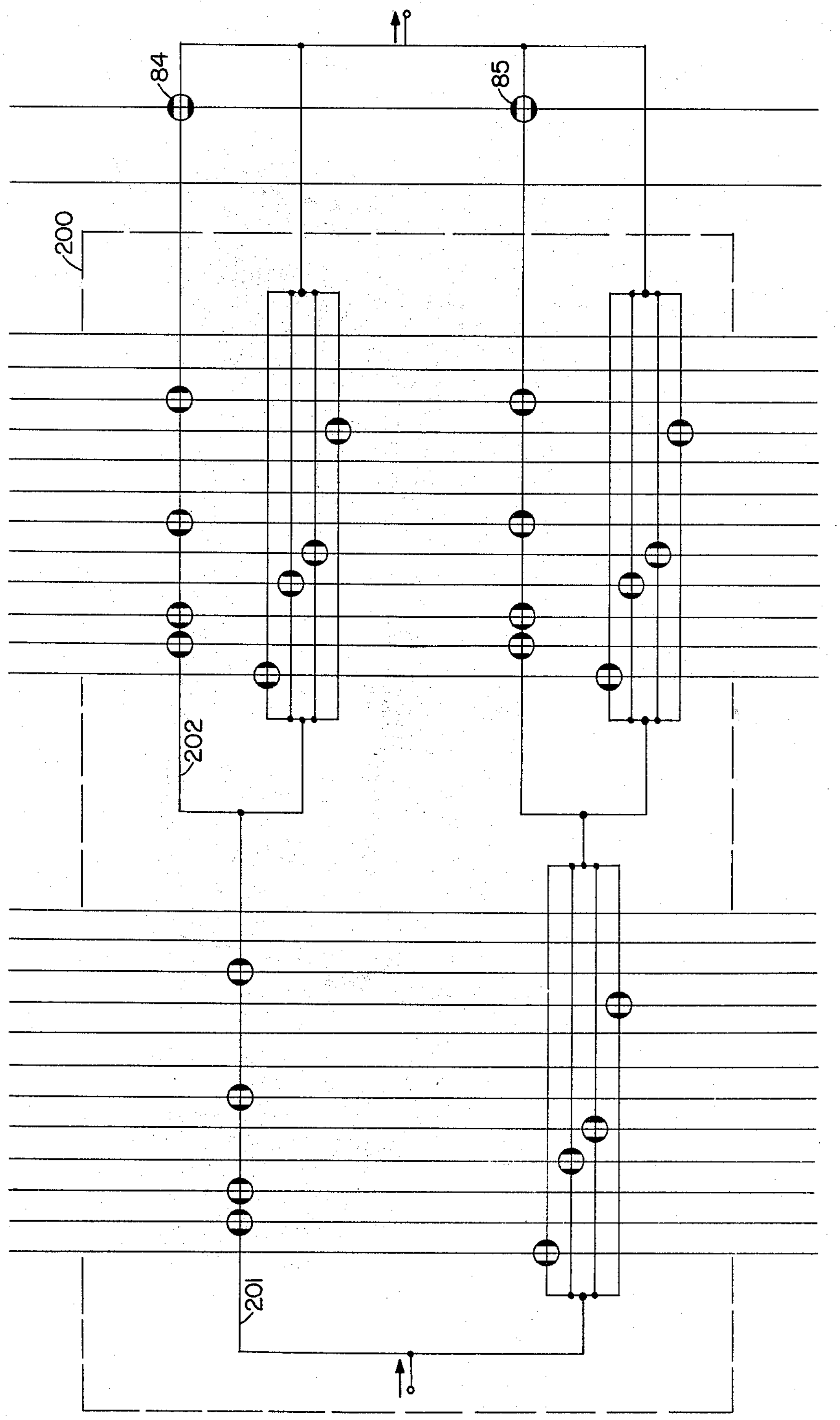

The selection and control circuits 30 through 32 are substantially the same in construction, and only one of them is illustrated and described in detail. The selection and control circuit 31 is arbitrarily selected, and it is illustrated in FIG. 3 through 6. These figures should be arranged one above the other as indicated in FIG. 7. Referring first to FIG. 3, the flip-flop 21, shown in block form in FIG. 1, is illustrated in detail, and it extends through portions of FIGS. 4 through 6. Inhibitors 80 and 81 are disposed in a cross-coupled arrangement, and they serve to maintain the flip-flop in its existing state. Inhibitors 82 and 83 in FIG. 3 and inhibitors 84 and 85 in FIG. 4 serve as One inputs to the flip-flop 21. When any one or more of them is energized, current from a terminal 86 in FIG. 3 is diverted to the One output line.

Figure 5:
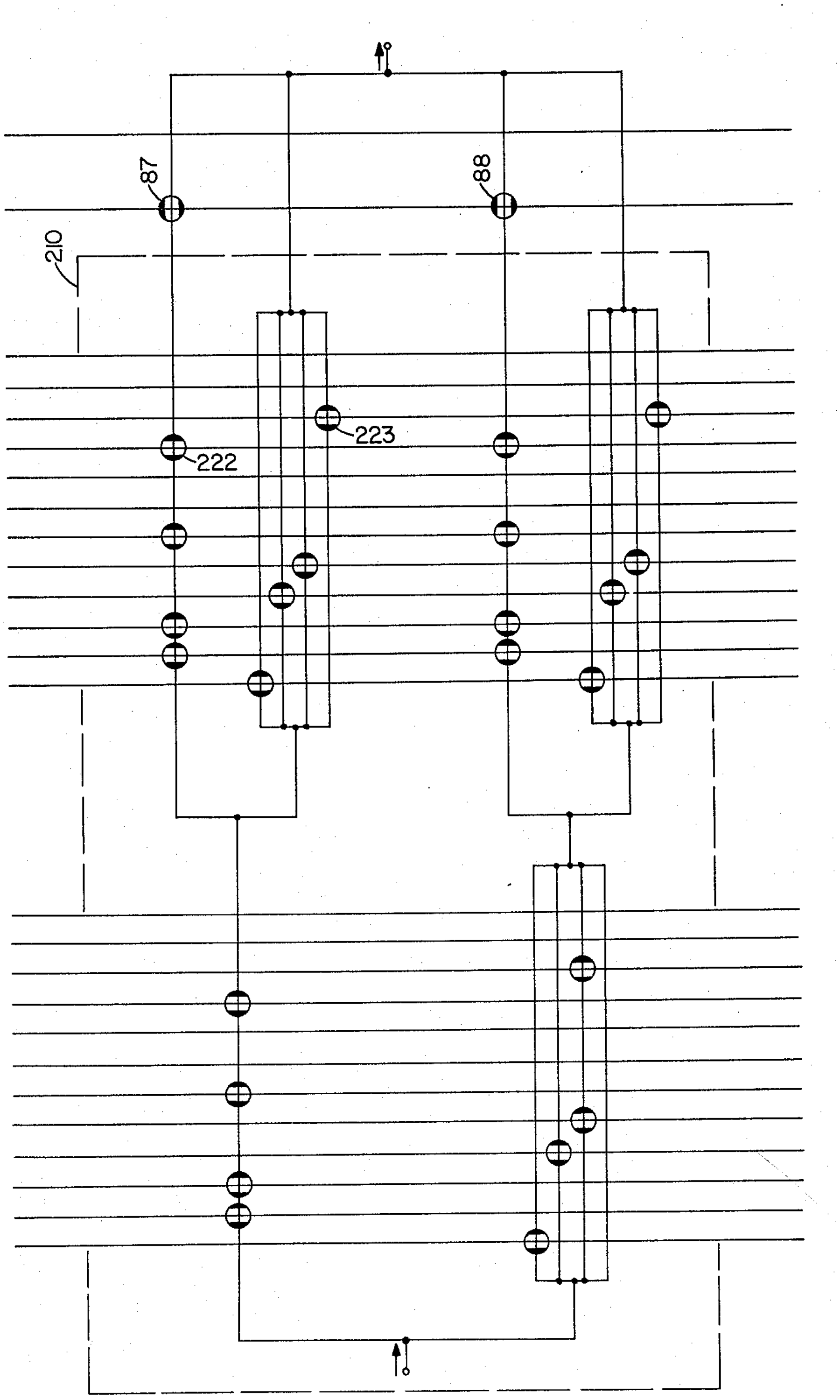
Figure 6:
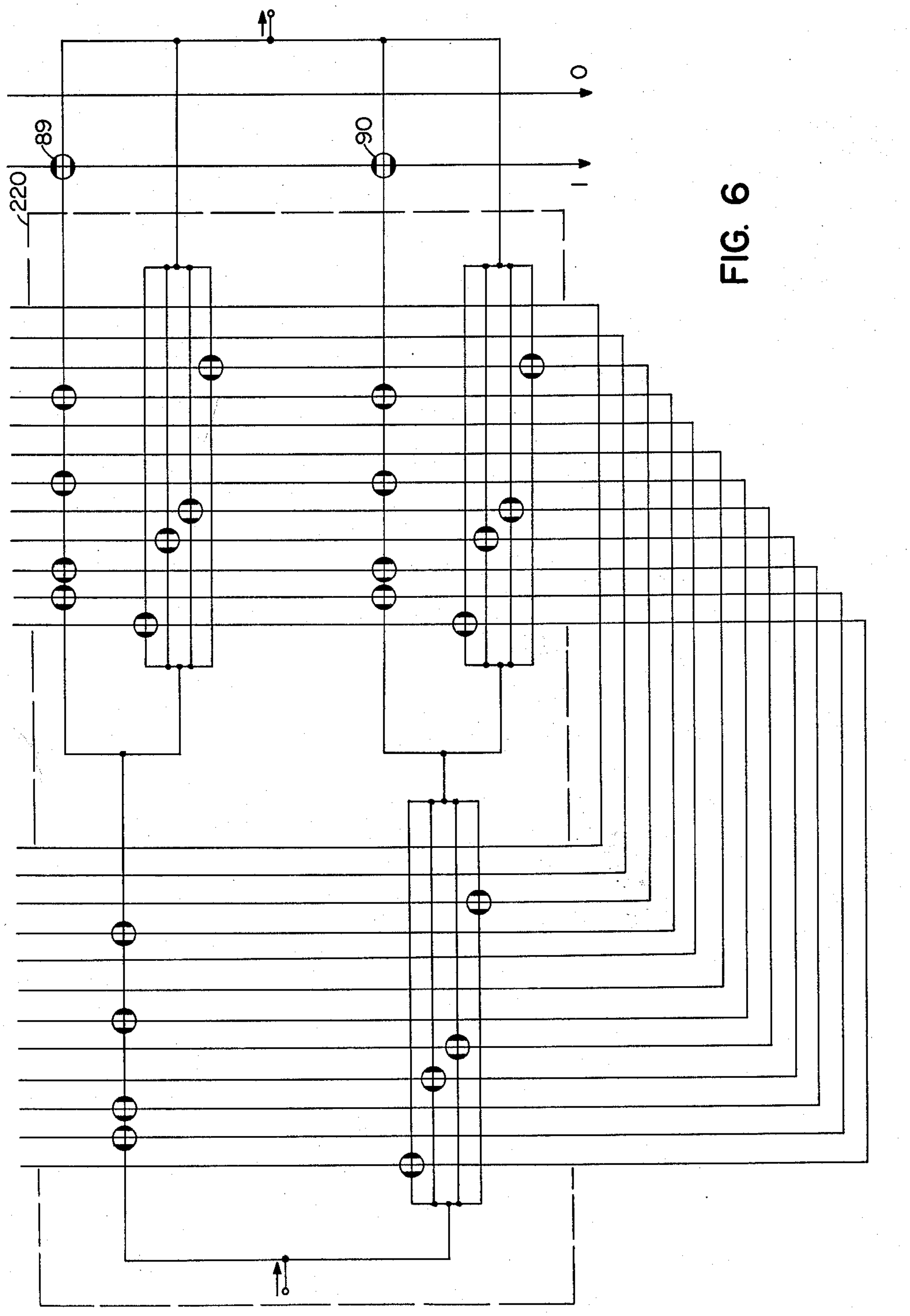

The inhibitors 87 and 88 in FIG. 5 and the inhibitors 89 and 90 in FIG. 6 serve as Zero input devices for the flip-flop 21, and if any one or more of them is energized, this flip-flop is set to the Zero state. When the flip-flop is set to the Zero state, current flows in the Zero output line. If it is set in the One state, current flows in the One output line.

A rectangular array 100 in FIG. 3 has vertical lines $W_1$, $W_2$, $W_3$ and $V_1$, $V_2$ and $V_3$ disposed as shown. Current from a terminal 101 flows along one or more of the horizontal lines of the array in FIG. 3 to an output terminal 102. Inhibitors are disposed at various intersections or crossover points of the vertical and horizontal lines of the array 100. The W lines are energized with various code combinations to select one of the flip-flops 20 through 22 in FIG. 1. The V lines of the array 100 in FIG. 3 are energized with various combinations of signals to indicate what state the selected flip-flop is to have, i.e., the One state or the Zero state. When the array 100 in FIG. 3 is operated to select the flip-flop 21 and set it to the One state, the inhibitor 82 is energized by a current from the terminal 101 provided there are no defects or open circuits in the array 100. The W code for selecting the flip-flop 21 is 101 for the vertical lines $W_1$, $W_2$ and $W_3$, respectively. If the flip-flop 21 is to be set to the One state, code bit $V_2$ has a One, and it is immaterial what the code bits $V_1$ and $V_3$ have. Since the bit $W_1$ has a One, current flows in the One line, and inhibitor 110 is operated to prevent current flow in the horizontal line 111. Likewise the inhibitor 112 is operated and prevents current flow in the horizontal line 113, and inhibitor 114 is operated to prevent current flow in the horizontal line 115. Since the bit $W_2$ has a Zero, inhibitors 120, 121 and 122 are operated to prevent current flow in respective horizontal lines 130, 131 and 132. Since the bit $W_3$ has a One, inhibitors 140, 141 and 142 are energized, and current flow in respective horizontal lines 150, 151 and 152 is inhibited. Since the bit $V_2$ has a One, inhibitors 160, 161 and 162 are energized and current flow in respective horizontal lines 170, 171 and 172 is inhibited. Accordingly, current from the terminal 101 avoids the resistive paths 111, 130, 150 and 170 and flows through a horizontal line 175 to a junction point 176. Current at this point avoids the resistive paths 115, 132, 152 and 172. Thus it flows from the junction point 176 through horizontal line 177 through the inhibitor 82 to the terminal 102. It should be pointed out that as long as the horizontal line 175 and the horizontal line 177 do not develop an open circuit condition, no current flows from the terminal 101 through any of the horizontal lines 111, 130, 150 or 170 to the junction point 178, and hence no current flows along the horizontal line 179 through the inhibitor 83 to the terminal 102. Accordingly, the inhibitor 83 is not operated. The foregoing current path serves instead as a standby route for current from the terminal 101 in case either of the horizontal lines 175 or 177 develops an open circuit. Let it be assumed for purposes of illustration that one of these lines is broken. Current from the terminal 101 is unable in this case to flow along the line 175, and it must flow through the resistive paths of the horizontal lines 111, 130, 150 and 170 to the junction point 178. Although the current divides through these paths according to the value of the resistance in each path, the total current flowing to the point 178 is equal to the total current flowing from the terminal 101. Since each of the paths 113, 131, 151 and 171 is resistive and the path 179 is superconductive, current at the junction point 178 flows along the horizontal path 179 through the inhibitor 83 to the terminal 102. Accordingly, the inhibitor 83 is energized and sets the flip-flop 21 to the One state. If the horizontal line 179 should develop an open circuit condition, the array 100 in FIG. 3 is completely disabled, and neither the inhibitor 82 nor the inhibitor 83 may be energized. In this event an array 200 in FIG. 4, identical in construction to the array 100 in FIG. 3, operates the inhibitor 84 if there are no open circuits in this array. If either of the horizontal lines 201 or 202 has an open circuit, then the array 200 operates the inhibitor 85 as explained above with respect to the array 100.

The array 210 in FIG. 5 and the array 220 in FIG. 6 are substantially the same in construction as the array 100 in FIG. 3. The arrays 210 and 220 have the inhibitors on the $V_2$ line disposed differently so as to set the flip-flop 21 to the Zero state. In this connection note that the inhibitors 222 and 223 of the array 210 in FIG. 5 are disposed on the respective One and Zero lines of the bit $V_2$ whereas the inhibitors 162 and 163 of the array 100 in FIG. 3 are disposed differently on the respective One and Zero lines of the bit $V_2$.

The foregoing discussion has been concerned with duplications of horizontal lines in the arrays of FIGS. 3 through 6. Since open circuit conditions may develop in the vertical W and V lines, duplicates of these lines and associated inhibitors are likewise provided, but such lines and associated inhibitors are omitted from the drawings in the interest of simplicity.

Figure 8:
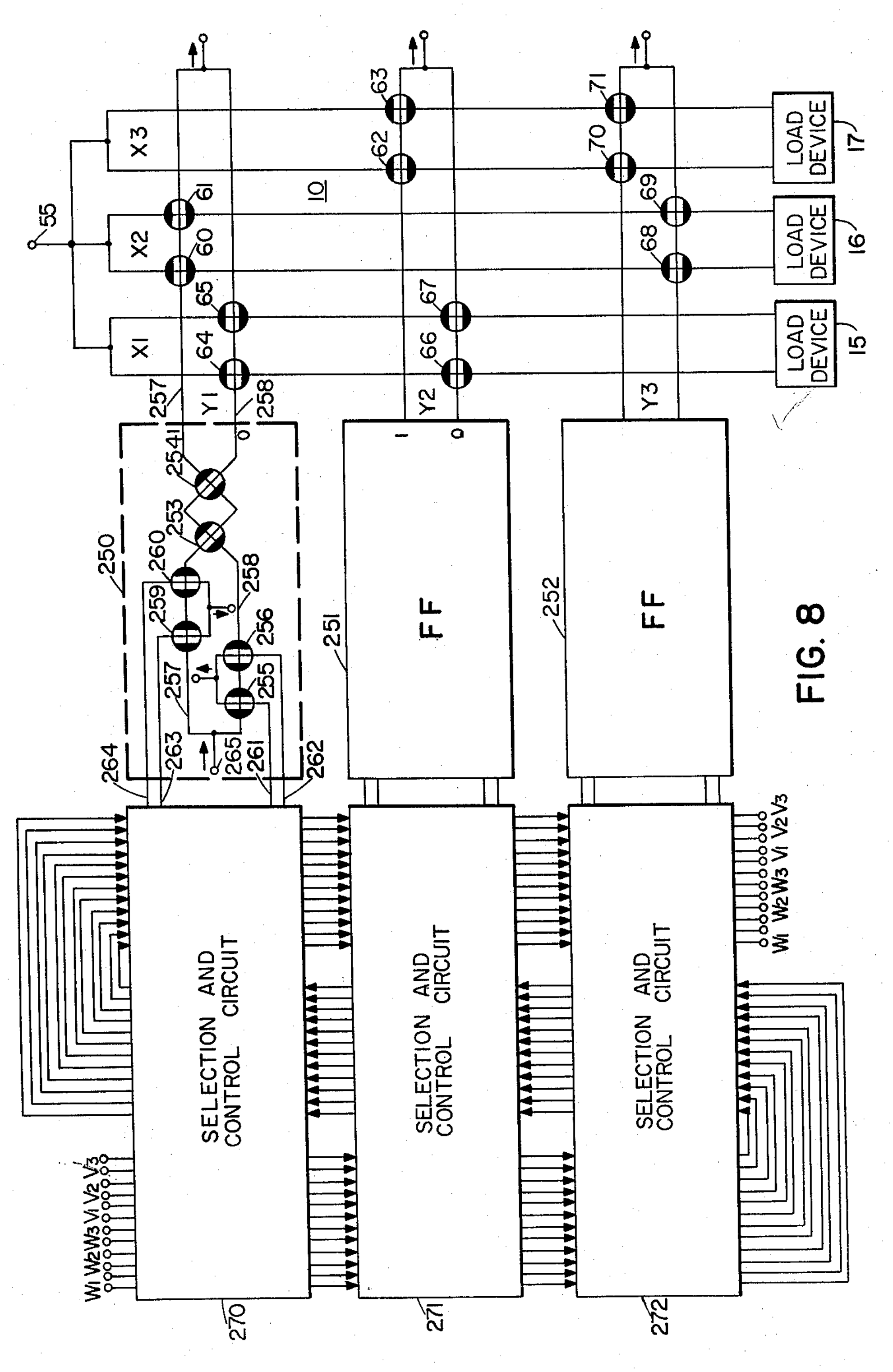

Referring next to FIG. 8, the three by three array 10 in FIG. 1 is shown, and its parts are numbered with the same numerals employed in FIG. 1. Flip-flops 250 through 252 in FIG. 8 perform the same function as the flip-flops 20 through 22 in FIG. 1 but have two less inputs. The flip-flops 250 through 252 are identical in construction, and only the flip-flop 250 is illustrated in detail in FIG. 8. Inhibitors 253 and 254 are cross-coupled as shown, and they serve to maintain the flip-flop 250 in its existing state. When either of the inhibitors 255 or 256 is energized, the flip-flop 250 is set in the One state, and current from a terminal 265 flows along the line 257 since the line 258 is resistive. When either one of the inhibitors 255 or 256 is energized, neither of the inhibitors 259 or 260 is energized. Thus, the line 257 is superconductive when the line 258 is rendered resistive. Current from the terminal 265 accordingly flows along the line 257 which serves as the One output line for the flip-flop 250.

If either of the inhibitors 259 or 260 is energized a portion of the line 257 is rendered resistive, and the line 258 is rendered superconductive since neither of the inhibitors 255 or 256 is energized at this time. Accordingly, current from the terminal 265 flows along the line 258 to the Zero output line of the flip-flop 250. Current on any one of the lines 261 through 264 energizes a respective one of the inhibitors 255, 256, 259 and 260. Thus, it is seen how the flip-flop 250 is operated. Flip-flops 251 and 252 operate in like fashion since they are identical in construction to the flip-flop 250. The manner in which the flip-flops 250 through 252 operate the array 10 to cause current from the terminal 55 to be applied to one of the loads 15, 16 or 17 was explained above with reference to FIG. 1.

The selection and control circuits 270 through 272 in FIG. 8 are operated in response to signals on the lines $W_1$ through $W_3$ and $V_1$ through $V_3$. Combinations of signals on theses lines are employed to manipulate the flip-flops 250 through 252 and thereby effect selection of one of the load devices 15 through 17. The selection and control circuits 270 through 272 in FIG. 8 perform the same function as the selection and control circuits 30 through 32 in FIG. 1. However, the selection and control circuits 270 through 272 in FIG. 8 have a more simplified construction than the selection and control circuits 30 through 32 in FIG. 1. It is readily seen from a comparison of FIGS. 1 and 8 that the control lines $W_1$ through $W_3$ and $V_1$ through $V_3$ are disposed differently. The signals on the lines $W_1$ through $W_3$ select which one of the flip-flops 250 through 252 is to be operated, and signals on the lines $V_1$ through $V_3$ indicate whether the selected flip-flop is to be set to the One state or the Zero state. The line $V_2$ controls the flip-flop 250. The One line of $V_2$ is energized when the flip-flop 250 is to be set to the One State. The Zero line of $V_2$ is energized when the flip-flop 250 is to be set to the One state. The lines $V_1$ and $V_3$ are operated in like fashion to control the operation of respective flip-flops 251 and 252.

Figure 12:
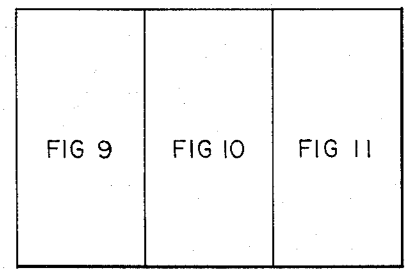
FIGS. 8 through 12 illustrate another arrangement according to this invention.
Figure 9:
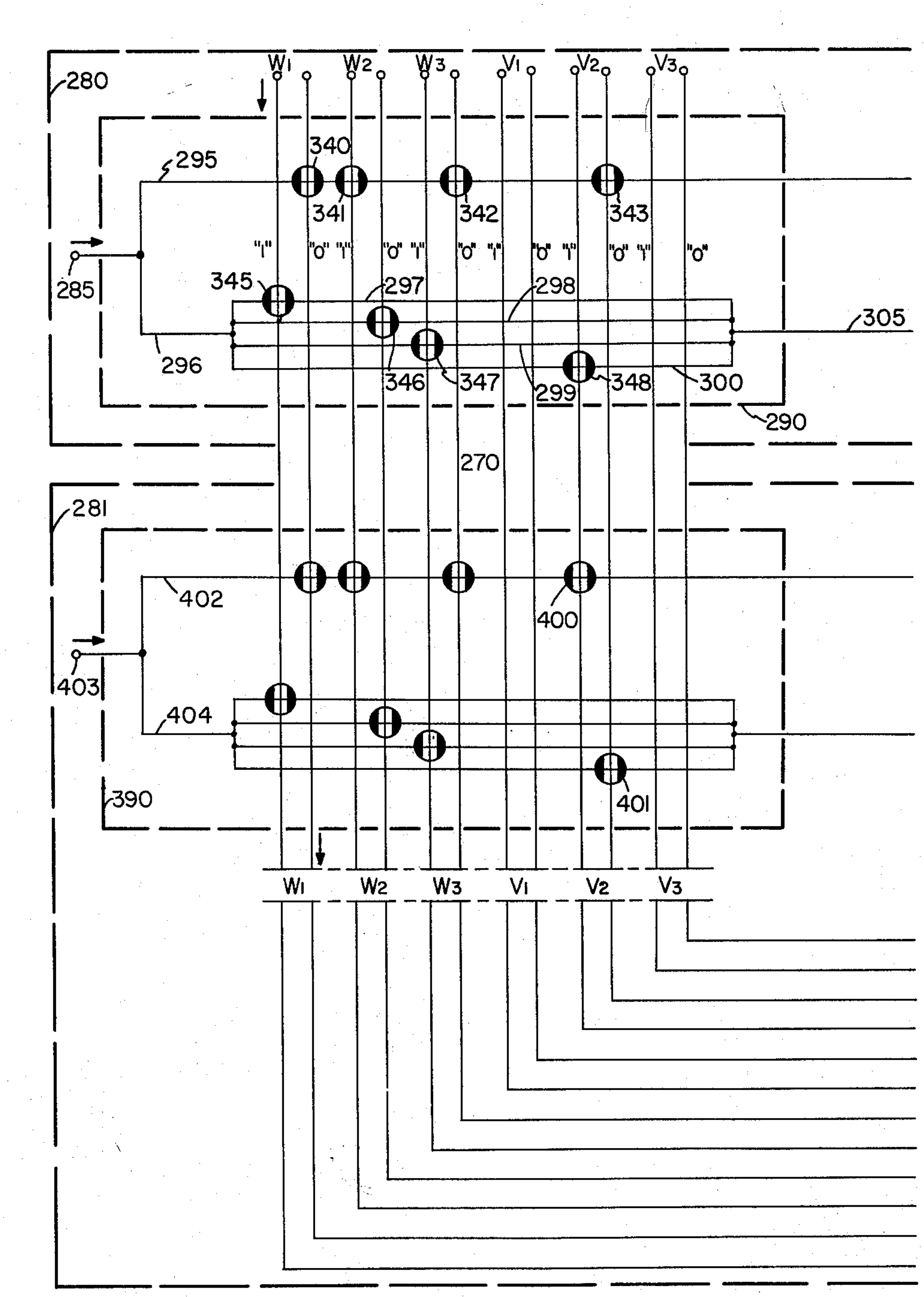
Figure 10:
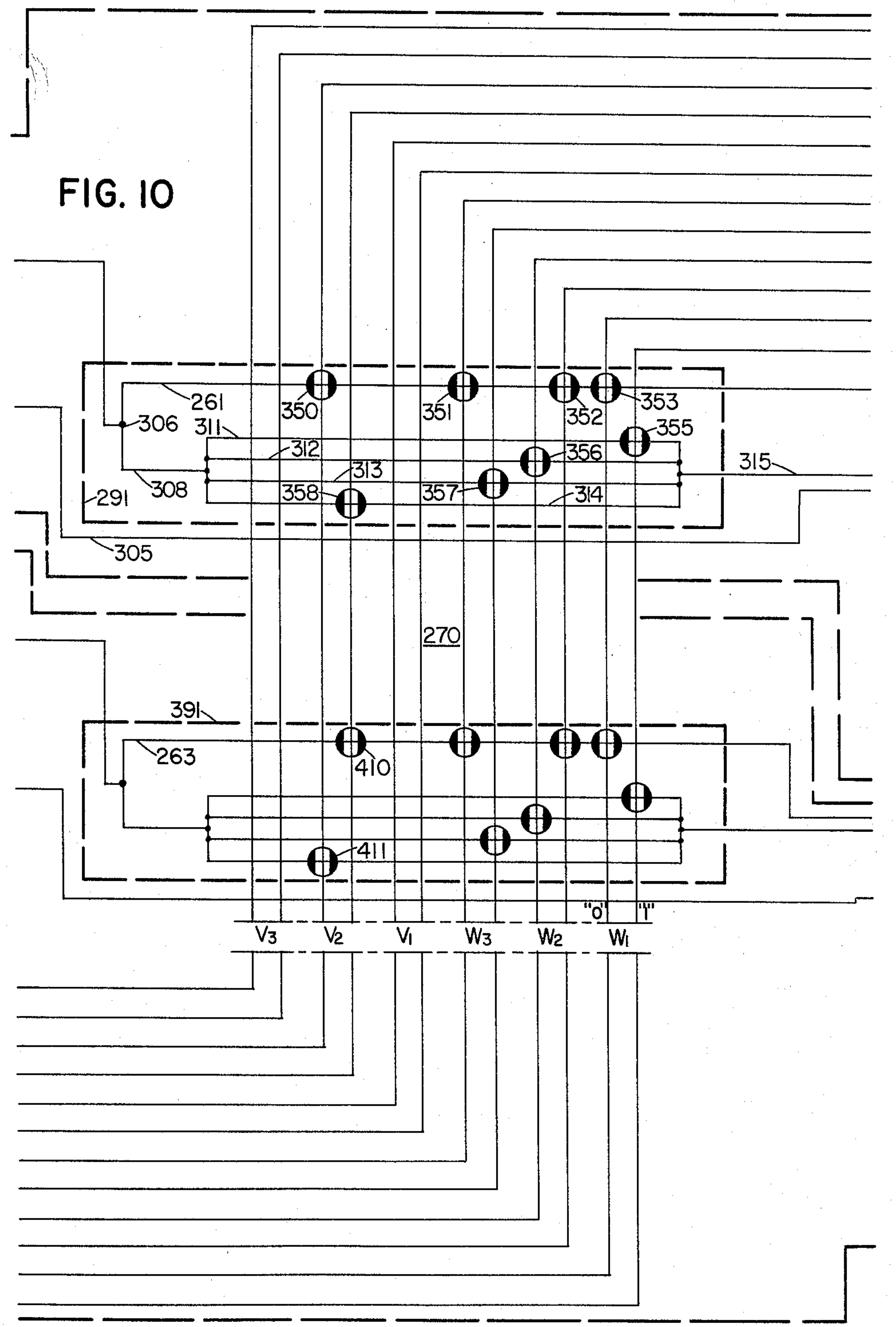
Figure 11:
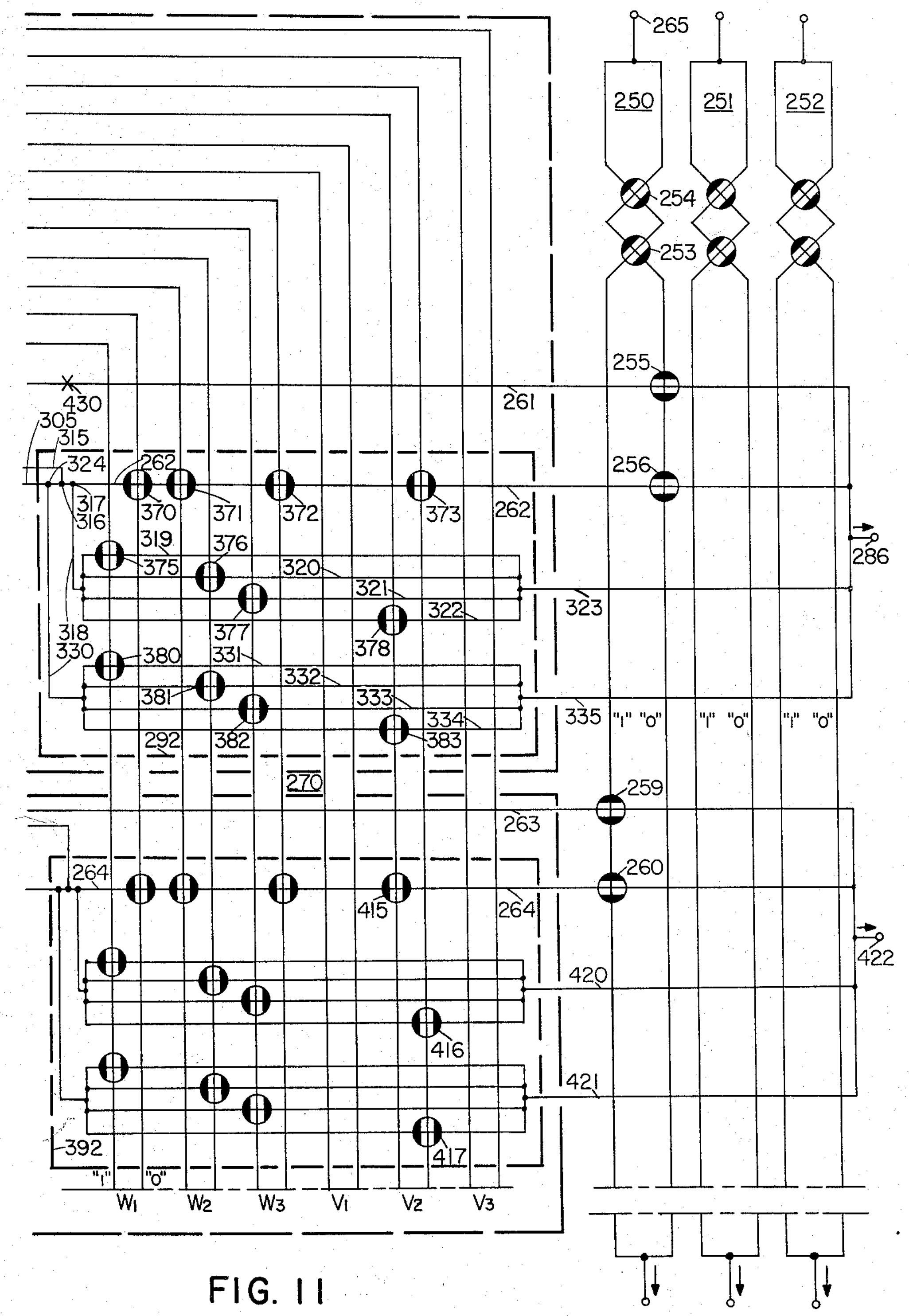

Referring next to FIGS. 9 through 11, the details of the selection and control circuit 270 are illustrated. FIGS. 9 through 11 should be arranged with respect to one another as indicated in FIG. 12. The selection and control circuits 270 through 272 in FIG. 8 are essentially the same in construction, and it is felt that a detailed showing and description of one of them should suffice for an understanding of the remaining ones. It is pointed out subsequently that the differences in the selection and control circuits 270 through 272 lies in the manner in which the inhibitors are disposed on the lines $V_1$ through $V_3$. In FIG. 11 the flip-flop 250 is illustrated in detail, and it includes inhibitors 253 and 254 disposed in a cross-coupled arrangement whereby they serve to maintain the flip-flop in its existing state. The inhibitors 259 and 260 serve as Zero inputs to the flip-flop 250. If either one of them is energized, current from a terminal 265 is diverted to the Zero output line.

The inhibitors 255 and 256 serve as One inputs for the flip-flop 250, and if either of them is energized, this flip-flop is set to the One state. In this condition current from the terminal 265 is diverted to the One output line. The inhibitors 255, 256, 259 and 260 are energized or not energized by the selection and control circuit 270 of FIGS. 9 through 11. The operation and construction of selection and control circuit 270 is now described.

The control circuit 270 is disposed in FIGS. 9, 10 and a portion of FIG. 11, and it may be considered as an array composed of two smaller arrays 280 and 281 which are similar in construction. The array 280 is manipulated by the signals on the lines $W_1$ through $W_3$ and $V_1$ through $V_3$ to control the energization of the inhibitors 255 and 256. The array 281 responds to signals on the lines $W_1$ through $W_3$ and $V_1$ through $V_3$ to control the energization of the inhibitors 259 and 260. Thus, it is seen that when the flip-flop 250 is to be set in the One state, the array 280 is employed to energize one of the inhibitors 255 or 256, and when the flip-flop 250 is to be set to the Zero state, the array 281 is employed to operate either the inhibitor 259 or the inhibitor 260.

The array 280 has a terminal 285 in FIG. 9 which receives current from a source not shown, and this current flows along the horizontal lines of the array to a terminal 286 in FIG. 11. The particular path through which the current flows from the terminal 285 in FIG. 9 to the exit terminal 286 in FIG. 11 is determined by the signals applied to the lines $W_1$ through $W_3$ and $V_1$ through $V_3$ and the associated inhibitors. The rectangular array 280 is composed of three smaller arrays 290, 291 and 292 which are interconnected as shown. The array 290 includes a line 295 in its upper portion and a line 296 in its lower portion. The line 296 has parallel branches 297 through 300. Current in any one or more of the branch lines 297 through 300 is conveyed on a line 305 to the array 292 in FIG. 11. Current on the line 295 of the array 290 in FIG. 9 flows to a junction point 306 in FIG. 10, and from here current may flow on a line 261 or a line 308. Current on the line 261 in FIG. 10 energizes the inhibitor 255 in FIG. 11. Current on the line 308 of the array 291 in FIG. 10 may flow through one or more of parallel branches 311 through 314 to a line 315 and then to a junction point 316 in FIG. 11. From here current may flow along the line 262 to energize the inhibitor 256 and exit through the terminal 286. Also, current from the junction piont 316 may flow along the line 262 to a junction point 317, then along a line 318 through any one of the branch lines 319 through 322 to a line 323 and then to the exit terminal 286. Further, current from the junction point 316 may flow to a junction point 324, then along a line 330 through one or more of the parallel branches 331 through 334 to a line 335 and then to the exit terminal 286. Current on the line 305 in FIG. 9 may flow to the junction point 316 in FIG. 11. From here the current may flow on the line 330, through one or more parallel branches 331 through 334 and along the line 335 to the exit terminal 286. Also, current from the junction point 324 may flow to the junction point 317, then along the line 318 through one or more parallel branches 319 through 322 and along the line 323 to the exit terminal 286. Alternatively, current at the junction point 317 may flow along the line 262 to the exit terminal 286.

It is pointed out that if current flows on either line 323 or line 335, it is not effective to change the state of the flip-flop 250. The lines 323 and 335 are used for the purpose of conveying current from the terminal 285 in FIG. 9 to the exit terminal 286 in FIG. 11 whenever the flip-flop 250 is not selected. For example, if the flip-flop 251 in FIG. 11 is being operated by the selection and control circuit 271 in FIG. 8, the lines 323 and 335 in FIG. 11 convey current to the exit terminal 286, and no current flows through the lines 261 and 262 so that the inhibitors 255 and 256 in FIGS. 8 and 11 are not operated. The lines 323 and associated parallel conductors 319 through 322 are duplicated by the line 335 and associated parallel conductors 331 through 334. This duplication provides added assurance that should one or more faults occur in one duplicate current from the terminal 285 in FIG. 9 may reach the terminal 286 in FIG. 11 without operating either of the inhibitors 255 or 256 when the flip-flop 250 is not selected for operation.

The array 290 in FIG. 9 has inhibitors 340 through 343 disposed on the line 295 and inhibitors 345 through 348 disposed on the respective lines 297 through 300. The array 291 in FIG. 10 has inhibitors 350 through 353 disposed on the line 261 and inhibitors 355 through 358 disposed on respective lines 311 through 314. The array 292 in FIG. 11 has inhibitors 370 through 373 disposed on the line 262 and inhibitors 375 through 378 disposed on respective lines 319 through 322 and inhibitors 380 through 383 disposed on respective lines 331 through 334.

The array 281 in FIGS. 9, 10 and 11 includes a group of smaller arrays 390, 391 and 392. The arrays 390, 391 and 392 correspond in construction and operation to the arrays 290, 291 and 292 of the array 280 in FIGS. 9, 10 and 11. The difference in construction lies in the manner in which the inhibitors are disposed on the line $V_2$. In FIG. 9, for instance, the inhibitor 343 is disposed on the Zero line of the bit $V_2$ while the inhibitor 400 is disposed on the One line of the bit $V_2$. Similarly, the inhibitor 348 in FIG. 9 is disposed on the One line of the bit $V_2$ within the matrix array 290 while the inhibitor 401 is disposed on the Zero line of the bit $V_2$ in the array 390. It should be pointed out that the line $V_2$ determines whether the flip-flop 250 is to be set to the Zero state or the One state whenever this flip-flop is selected for operation. Accordingly, when the bit $V_2$ is a One, the One line carries a current to signify that the flip-flop 250 should be set to the One state. The current on the One line of the bit $V_2$ does not inhibit the flow of current in the line 295 of the matrix 290, but it does inhibit the flow of current in the line 402 of the matrix 390 in FIG. 11 since the inhibitor 400 is energized and renders a portion of the line 402 resistive. Accordingly, current from a terminal 403 of the matrix 390 is diverted from the line 402 to a line 404. This suffices to show why the inhibitors 343 and 348 of the array 290 in FIG. 9 are disposed differently from the inhibitors 400 and 401 of the array 390 in FIG. 9. For like reasons, the inhibitors 350 and 358 on the bit $V_2$ lines in the array 291 in FIG. 10 are likewise disposed differently from the inhibitors 410 and 411 on the lines of the bit $V_2$ in the array 391 in FIG. 10. Likewise, the inhibitors 373, 378 and 383 on the lines of the bit $V_2$ in the array 292 in FIG. 11 are disposed differently from the inhibitors 415, 416 and 417 on the lines of the bit $V_2$ in the array 392 in FIG. 11. It is pointed out here that the lines 420 and 421 from the array 392 in FIG. 11 perform in a similar fashion to the lines 323 and 335 from the array 292 in FIG. 11. That is, the lines 420 and 421 from the array 392 carry current to the exit terminal 422 in FIG. 11 whenever the flip-flop 250 is not selected or if the flip-flop 250 is selected for a change in state, the Zero input lines 263 and 264 are not to be energized. For example, if the flip-flop 250 is selected for operation and is to be set to the One state, the lines 263 and 264 are not energized with a current, but one of the lines 420 or 421, or possibly both, carry current to the exit terminal 422.

It is felt that a detailed illustration of the operation of the array 280 in FIGS. 9 through 11 will suffice for an understanding of the operation of the array 281 in these figures. For purposes of illustration, let it be assumed that the flip-flop 250 in FIG. 11 is to be set to the One state. The W code for selecting the flip-flop 250 is One, Zero, One for the vertical lines $W_1$, $W_2$ and $W_3$, respectively. The bit $V_2$ is a One, and it is immaterial what the bits $V_1$ and $V_3$ are since they do not affect the operation of the selection and control circuit 270 in FIGS. 9 through 11. The object then is to insure that current from the terminal 285 in FIG. 9 flows along the line 295 of the array 290 to the junction point 306 in the array 291 and then along the line 261 to operate the inhibitor 255 in FIG. 11 and exit through the terminal 286. Let it be assumed further at this point that there are no broken lines in the array 280 in FIGS. 9 through 11.

In view of the foregoing assumptions it is easily seen that a current in the One line of the bit $W_1$ operates the inhibitor 345. Since the Zero line of the bit $W_1$ carries no current the inhibitor 340 is not operated. Current flows in the Zero line of the bit $W_2$ and operates the inhibitor 346, but no current flows in the One line of the bit $W_2$ so that the inhibitor 341 is not operated. Current in the One line of the bit $W_3$ operates the inhibitor 347, and since no current flows in the Zero line of bit $W_3$ the inhibtor 342 is not operated. The current flow in the One line of the bit $V_2$ actuates the inhibitor 348, and since no current flows in the Zero line of the bit $V_2$ the inhibitor 343 is not operated. Accordingly, the inhibitors 345, 346, 347 and 348 are actuated to render respective lines 297 through 300 resistive in part. Accordingly, current from the terminal 285 is diverted by this resistance to the line 295 which is superconductive since all of the inhibitors 340 through 343 are not operated. The current flows along the line 295 in the array 290 to the junction point 306 of the array 291 in FIG. 10. The signals on the lines $W_1$, $W_2$, $W_3$ and $V_2$ cause the inhibitors 355 through 358 to be operated and render respective lines 311 through 314 resistive. Accordingly, current from the junction point 306 is diverted to the superconductive line 261. This line is superconductive because the inhibitors 350 through 353 are not operated by signals on the lines $W_1$, $W_2$, $W_3$ and $V_2$. Current on the line 261 in FIG. 10 flows through the inhibitor 255 in FIG. 11 and on to the exit terminal 286. Since the inhibitor 255 is operated, this causes the flip-flop 250 to be set to the One state in a manner previously explained. Thus, it is seen that the array 280 in FIGS. 9, 10 and 11 is operated by signals on the lines $W_1$ through $W_3$ and $V_2$ to set the flip-flop 250 in FIG. 11 to the One state. By making the foregoing assumptions and changing the bit $V_2$ from One to Zero it can be seen readily that the array 281 in FIGS. 9 through 11 is operated to set the flip-flop 250 in FIG. 11 to the Zero state.

Let it be assumed for purposes of illustration that the array 280 in FIGS. 9 through 11 is operated by signals on the lines $W_1$ through $W_3$ and $V_2$ to set the flip-flop 250 in the One state and that the line 261 is broken at the point 430 in FIG. 11. As previously explained, current from the terminal 285 in FIG. 9 flows to the junction point 306 of the array 291 in FIG. 10. Since the line 261 has an open circuit condition, current cannot flow along the line 261. Instead, it flows along the line 308, divides and flows along the parallel branches 311 through 314 according to the magnitude of the resistance in each of these lines. These currents are combined in the line 315 and flow to the junction point 316 of the array 292 in FIG. 11. The signals on the lines $W_1$ through $W_3$ and $V_2$ operate inhibitors 375 through 378 to render respective lines 319 through 322 resistive and the inhibitors 380 through 383 to render respective lines 331 through 334 resistive. The resistances in the lines 319 through 322 and 331 through 334 divert the current at the junction 316 to the line 262 which is superconductive because the inhibitors 370 through 373 are not operated. Current on the line 262 flows through the inhibitor 256 to the exit terminal 286, and the inhibitor 256 operates the flip-flop 250 to set it to the One state. Thus it is seen that a break in the line 261 at the point 430 in FIG. 11 does not prevent operation of the array 280 in FIGS. 9 through 11. The array 281 operates in like fashion should a similar break occur therein under the same operating conditions. It is pointed out that breaks may occur in numerous places in either or both of the arrays 280 and 281 without disabling completely the ability of these arrays to respond to signals on the W and V lines and operate the flip-flop 250.

The foregoing discussion has been concerned with alternate paths for currents in the horizontal lines of the arrays 280 and 281 in FIGS. 9 through 11. Since open circuit conditions may develop in the vertical lines $W_1$ through $W_3$ and $V_1$ through $V_3$, duplicates of these lines and associated inhibitors may likewise be provided, but such lines and associated inhibitors are omitted from the drawings in the interest of simplicity. Accordingly, a very highly reliable selection and control circuit is provided.

What is claimed is:

1. In a cryogenic data handling device having a plurality of component parts buried in a liquified gas bath, an error correction device including at least one spare part associated with each of the component parts and being identical in construction therewith, first means coupled to the component parts and the associated spare parts for substituting any spare part for any defective part, and second means coupled to the first means for operating the first means, said second means including a code-responsive device which in turn has component parts and associated spare parts, whereby a highly reliable data handling device is provided.

2. The device of claim 1 wherein any component part and its associated spare part are arranged according to one set of coordinate lines in an array and control lines are disposed according to another set of coordinate lines in the array.

3. The apparatus of claim 2 wherein the code responsive device is an array which responds to code signals on one set of coordinate lines and provides output signals on another set of coordinate lines which control the substitution of any spare part for a defective part.

4. The apparatus of claim 3 wherein storage devices are disposed between the output lines of the code responsive array and the control line of the array which includes the spare parts.

5. A device employing cryogenic elements throughout its construction and including at least one component part, said component part having at least one identical spare part associated therewith, said component part and associated spare part being arranged along one set of coordinate lines of a first array with control lines disposed along another set of coordinate lines in the first array, the first array including inhibitors disposed at selected locations where the coordinate lines cross over one another, a second array responsive to code signals on one set of coordinate lines for controlling output signals from another set of coordinate lines of the second array, the second array including inhibitors disposed at selected locations where the coordinate lines cross over one another, means coupling the output signals of the second array to the control lines of the first array.

6. The device of claim 5 wherein cryotrons are employed as inhibitors.

7. The device of claim 6 wherein the second array has component parts and associated spare parts, the space parts being selectively operated to correct for a defective part so long as a good spare part is available.

8. A cryogenic data handling device having a plurality of component parts buried in a liquified gas bath, each of said component parts comprising rectangular array circuitry disposed on a printed circuit plate and having at least one identical spare part adapted to be substituted therefor, and control means coupled to said component parts and said identical spare parts operable to inhibit said identical spare parts as long as said component parts are free from defects and operable to replace any defective component part with an identical spare part, whereby a highly reliable data handling device is provided.

9. A cryogenic data handling system having a plurality of rectangular array inhibitor devices, each of said rectangular array inhibitor devices having at least one identical spare device adapted to be substituted therefor, a rectangular control array of inhibitors coupled to said inhibitor devices and said identical spare devices for inhibiting the operation of defective and unused spare devices, and a code responsive device for operating said rectangular control array of inhibitors.

10. The combination of claim 9 wherein said code responsive device comprises rectangular array inhibitor circuitry having associated spare devices.

References Cited by the Examiner

UNITED STATES PATENTS

| | | | |
|---|---|---|---|
| 2,070,671 | 2/37 | Meissner ---------- | 179—175.31 |
| 2,229,089 | 1/41 | Kinsburg ---------- | 179—175.31 |

OTHER REFERENCES

Radio-Electronics, July 1956, pages 55–57 (Rymsha).

Proc. of I.R.E., April 1956, pages 482–493 (Buck).

Fundamentals of Digital Computers, by M. Mandl, Prentice-Hall Inc., 1958.

ARTHUR GAUSS, *Primary Examiner.*

EVERETT R. REYNOLDS, THOMAS B. HABECKER, *Examiners.*